United States Patent
Garces et al.

[11] Patent Number: 5,814,967
[45] Date of Patent: Sep. 29, 1998

[54] APPARATUS TO REDUCE NO LOAD CURRENT AT LOW FREQUENCIES

[75] Inventors: Luis J. Garces, Mequon; David M. Brod, Greendale, both of Wis.

[73] Assignee: Allen Bradley Company, LLC, Milwaukee, Wis.

[21] Appl. No.: 910,264

[22] Filed: Aug. 13, 1997

[51] Int. Cl.[6] .................................................. H02P 7/628
[52] U.S. Cl. ........................... 318/807; 318/809; 318/811
[58] Field of Search ..................... 318/727, 767, 318/798–802, 807, 809, 810, 811

[56] References Cited

U.S. PATENT DOCUMENTS

| | | | |
|---|---|---|---|
| 4,459,534 | 7/1984 | Nagase et al. | 318/808 |
| 4,958,117 | 9/1990 | Kerkman et al. | 318/805 |
| 5,329,217 | 7/1994 | Kerkman et al. | 318/811 |
| 5,541,488 | 7/1996 | Bansal et al. | 318/801 |

*Primary Examiner*—Bentsu Ro
*Attorney, Agent, or Firm*—Michael A. Jaskolski; John M. Miller; John J. Horn

[57] ABSTRACT

A system for accurately determining a torque current $i_{qe}$ for use in field oriented control of an induction motor at low rotor frequencies (e.g., about half of the motor rated frequency) which provides an ideal no load current and still enables high torque at low speed. The system includes a frequency/correction angle identifier which, based on an applied stator voltage frequency, provides a correction angle which is added to a perceived phase angle to generate a corrected phase angle which is used to calculate the torque current component $i_{qe}$. The torque current component is then used by a slip calculator and an IR compensator to adjust motor operation.

19 Claims, 4 Drawing Sheets

APPARATUS TO REDUCE NO LOAD CURRENT AT LOW FREQUENCIES

BACKGROUND OF THE INVENTION

The present invention relates to systems for controlling electric motors and, more particularly, to a system for reducing no load current and increasing maximum torque at low fundamental frequencies for "sensorless" and Volts/Hertz drives.

Field Oriented Control Of Induction Motors

All induction motors include a rotor mounted inside a stator for rotation about a rotation axis. A common rotor design includes a "squirrel cage winding" in which axial conductive bars are connected at either end by shorting rings to form a generally cylindrical structure. The stator is formed by a plurality of windings which surround the rotor and are typically arranged in three separate phases. Time varying voltages are applied across the stator windings which generate a magnetomotive force (MMF) and an associated stator magnetic field which rotates around the stator at a stator frequency primarily within the space defined by the rotor. As the stator field rotates about the rotor, relative motion between the stator field flux and the rotor bars induces voltages in the rotor at a slip frequency $\omega_{slip}$. The slip frequency $\omega_{slip}$ is the difference between the frequency of the stator voltages $V_s$ and the rotor speed. The voltages induced in the rotor cause rotor bar currents which in turn generate a rotor magnetic field. The rotor and stator fields interact to produce torque which causes rotor rotation.

Most motors are controlled via a dedicated motor controller. A typical controller receives a command frequency signal indicating a desired rotor frequency and generates stator voltages having specific frequencies and amplitudes which drive the rotor at the command frequency.

Referring to FIG. 1, a rotating phasor 5 corresponds to stator voltage $V_s$ will generally form some phase angle $\delta$ with respect to an associated rotating phasor 1 corresponding to a magnetic motive force (MMF) which is in turn associated with stator current (also referred to as apparent current $i_s$). The MMF will in turn generally have some angle $\alpha$ with respect to a phasor 2 corresponding to rotor flux $\Psi_r$. The torque generated by the motor is proportional to the magnitudes of phasors 1 and 2 and is also a function of angle $\alpha$. Phasor 1 may be usefully decomposed into a torque producing component 3 perpendicular to phasor 2 and a flux producing component 4 parallel to phasor 2.

Components 3 and 4 are proportional, respectively, to two stator currents $i_{qe}$, a torque producing current, and $i_{de}$, a flux producing current, which may be represented by orthogonal vectors in a rotating frame of reference (synchronous frame of reference).

Accordingly, in induction motor control, in addition to controlling the stator voltage amplitude and frequency, it is advantageous to control the stator voltage phase relative to the stator winding current $i_s$ and hence the division of stator winding current into $i_{qe}$ and $i_{de}$ components. Control strategies that attempt to independently control currents $i_{qe}$ and $i_{de}$ are generally termed field oriented control strategies ("FOC").

FOC can be intuitively understood with reference to the induction motor equivalent circuit illustrated in FIG. 2. The circuit includes line inductance $L_L$, stator and rotor leakage inductances $L_s$ and $L_r$, respectively, and line, stator and rotor resistances $R_L$, $R_s$ and $R_r$, respectively. Voltage $V_s$ across stator windings generates a stator current $i_s$ which divides between parallel branches $L_m$ and $L_r$ in series with $R_r$. Flux current $i_{de}$ flows through inductor $L_m$ and torque current $i_{qe}$ flows through resistor $R_r$. (The effect of the rotor leakage inductance is neglected.) The goal of FOC is to control the $i_{de}/i_{qe}$ current split and thereby control flux and torque.

Constant V/Hz Operation

While FOC is advantageous where complex hardware and powerful software are provided, many motor controllers lack hardware and software required for complete FOC. For this reason, many less expensive controllers are configured to take advantage of simpler control methods which are in some respects related to FOC.

For example, many induction motors are controlled to provide maximum constant torque when required regardless of motor speed. Torque is proportional to rotor flux $\Psi_r$ and therefore, in order to be able to provide the maximum torque at any given time, rotor flux $\Psi_r$ is usually held constant. Rotor flux $\Psi_r$ and stator voltage $V_s$ are related by the Equation:

$$V_s = \frac{d\Psi_r}{dt} \qquad \text{Eq. 2}$$

and stator frequency $f_s$ is related to a stator voltage period t by the Equation:

$$f_s = \frac{d\alpha}{dt} \qquad \text{Eq. 3}$$

Combining Equations 2 and 3 and rearranging:

$$\Psi_r \alpha \frac{V_s}{f_s} \qquad \text{Eq. 4}$$

Thus, theoretically, to be able to produce constant torque, the field and the stator Volts/Hz ratio must be kept constant (hence the term "constant V/Hz operation").

Many motor controllers take advantage of the relationships expressed by Equation 4 to facilitate simple torque control protocol wherein stator voltage $V_s$ is increased linearly as a function of the command stator frequency $f_s$. A typical V/Hz curve for an induction motor is illustrated as a solid line in FIG. 3.

One problem with V/Hz motor control has been compensating the stator voltage for line and stator winding power losses to maintain the rotor field constant. Referring again to FIG. 2, prior to splitting into flux current $i_{de}$ and torque current $i_{qe}$, stator current $i_s$ passes through resistances $R_L$ and $R_s$ and two voltage drops, $i_s R_L$ and $i_s R_s$, occur. These voltage drops are commonly referred to as IR losses. IR losses alter the V/Hz linear relationship and can in fact shift the entire V/Hz curve down appreciably. In FIG. 3, a typical V/Hz shift is illustrated as dashed line ($V_s$—IR). In addition to line and stator IR losses, other IR losses are caused by filter networks or the like commonly employed to reduce line harmonics, eliminate reflected voltage, etc.

To compensate for IR losses, many controllers include additional current feedback that allows the controller to determine the magnitude of IR loss and an associated IR loss compensator. Referring again to FIGS. 1 and 2, current $i_{qe}$ is approximately in phase with stator voltage $V_s$ and is therefore a real portion of stator current $i_s$. For this reason, the magnitude of current $i_{qe}$ is often used in an IR feedback as an indicator of IR losses. For example, when current $i_{qe}$ is increased by 10, it can be assumed that IR losses increase by approximately 10%. When $i_{qe}$ increases by 15%, IR losses likewise increase by approximately 15%.

In addition to the IR feedback loop, in order to drive the rotor speed at a frequency which is equal to the command frequency, it is advantageous to have a frequency feedback loop which identifies the slip frequency $\omega_{slip}$. The slip frequency $\omega_{slip}$ is typically added to the command frequency to provide a stator or applied voltage frequency $\omega_s$. When the applied voltage frequency is used to drive the motor, the rotor lags the stator voltage by the slip frequency $\omega_{slip}$ and is therefore driven at the command frequency. To this end complex controllers will typically include a resolver or tachometer configured to determine actual rotor frequency.

In less complex controllers which do not include speed sensing hardware, often rotor or slip frequency is derived from other sensed operating parameters. In particular, many controllers will derive a slip frequency $\omega_{slip}$ via the torque and flux currents, $i_{qe}$, $i_{de}$, respectively. To this end the slip frequency $\omega_{slip}$ can be expressed as:

$$\omega_{slip} = \frac{i_{qe} \cdot R_r}{i_{de} \cdot (L_m + L_r)} \qquad \text{Eq. 5}$$

$R_r$, $L_r$ and $L_m$ are known, name plate values provided by the manufacturer or are measured during a commissioning tuning procedure.

In Equation 5, for the purposes of inexpensive controllers, $R_r$, $L_r$ and $L_m$ are typically assumed constant (i.e. temperature and saturation dependent variations are ignored). In addition, because flux current $i_{de}$ is proportional to rotor flux $\Psi_r$ and rotor flux $\Psi_r$ is proportional to the V/Hz ratio (see Equation 4), current $i_{de}$ is assumed constant and can be represented by a constant proportional to the V/Hz ratio. Thus, Equation 5 can be reduced to:

$$\Psi_{slip} = i_{qe} \cdot K \qquad \text{Eq. 6}$$

where K is a constant representing the dependence on $R_r$, $i_{de}$, $L_m$ and $L_r$.

Thus, a single feedback loop providing current $i_{qe}$ can facilitate both frequency and voltage compensation.

Deriving $i_{qe}$

Perhaps the most common way to derive current $i_{qe}$ is by sensing stator currents in at least two of three stator winding supply lines and using the commanded voltage $V_s$, deriving the third stator current from the two sensed currents, performing the required coordinate transformations on the three stator currents to provide d and q-axis stationary currents $i_{ds}$ and $i_{qs}$, determining the phase angle $\delta$ (see FIG. 1) between stator voltage $V_s$ and stator current $i_s$, and performing a stationary-to-synchronous transformation on currents $i_{ds}$ and $i_{qs}$ according to the following Equation for the q-direction:

$$i_{qe} = i_{ds} \cdot \cos\delta + i_{qs} \cdot \sin\delta \qquad \text{Eq. 7}$$

Angle $\delta$ is typically determined by measuring the time between zero crossings of commanded stator voltage $V_s$ and measured current $i_s$ and scaling the difference to account for stator frequency or by time integration of the commanded frequency fs.

However, line and stator IR drops will result in actual $i_{qe}$ which is out of phase with respect to $V_s$, effectively shifting the angle $\delta$. Therefore the calculated current $i_{qe}$ will be different from the actual $i_{qe}$. This is particularly true where rotor frequency is low (i.e. <15 Hz).

Referring again to FIG. 2, the ratio of stator voltage $V_s$ dropped across the line and stator resistances $R_L$ and $R_s$ to the drop across inductor $L_m$ is clearly frequency dependent. Referring also to FIG. 4a, stator voltage $V_s$, current $i_s$ and d and q-axis synchronous currents $i_{de}$ and $i_{qe}$ for a relatively high rotor frequency (e.g. >15 Hz) are illustrated. At high frequencies the voltage drop across, and current $i_{de}$ through, inductor $L_m$ are appreciable. In this case it is relatively easy to identify angle $\delta$.

However, referring also to FIG. 4b, FIG. 4b illustrates stator voltage $V_s$, stator current is and currents $i_{de}$ and $i_{qe}$ for low frequency operation (e.g. <15 Hz). At low frequencies the voltage drop across inductor $L_m$ is almost insignificant compared with the IR drop across resistors $R_L$ and $R_s$. Here the stator current $i_s$ (e.g. apparent current) is almost in phase with the stator voltage $V_s$ and any indication of motor load is lost.

At low frequencies, IR stator voltage drops tend to produce an erroneous angle $\delta$ resulting in an incorrect $i_{qe}$ calculation according to Equation 7. In particular, feedback angle $\delta$ is often less than the actual angle $\delta$ which causes feedback current $i_{qe}$ to be greater than the actual current $i_{qe}$. As a result, the slip frequency $\omega_{slip}$ is incorrectly calculated according to Equation 6.

In addition, because derived feedback current $i_{qe}$ is greater than actual current $i_{qe}$, the IR feedback loop increases the voltage $V_s$ and associated current $i_s$ to compensate for incorrectly perceived additional IR losses ($i_{qe}$ is proportional to IR loss and when $i_{qe}$ increases, perceived IR loss also increases). The increased voltage $V_s$ and current $i_s$ result in heavy motor saturation even under no load.

Referring to FIG. 5, stator current $i_s$ is plotted on an abscissa as a function of torque on an ordinate axis. As illustrated by a solid curve, at low frequencies, the IR feedback loop causes stator current $i_s$ to increase appreciably causing high steady state no load currents.

High no load current and motor saturation, although they allow the production of higher torque, they are disadvantageous as they can result in premature component deterioration and eventual permanent motor component damage. In addition, saturation and high no load current cause inefficient power use.

One solution to this problem is to drive motors at frequencies higher than 15 Hz. As indicated above, at high frequencies even relatively imprecise detectors can identify an angle $\delta$ and determine a sufficiently accurate current $i_{qe}$. Unfortunately, this is not an option for many applications where low frequency operation is the norm.

Another solution would be to limit the maximum IR compensation. However, this has the adverse affect of limiting the maximum available torque at low frequencies. At low frequencies, when load is increased, additional torque may be required to drive a motor. Increased torque can only be achieved by increasing stator current $i_s$ and therefore cannot be provided if stator current $i_s$ is limited due to the limited voltage.

Yet one other solution would be to provide more complex and accurate sensing hardware to derive a better current $i_{qe}$ estimate. This solution, however, is cost prohibitive in many applications.

Thus, it would be advantageous to have a simple apparatus and/or method which could reduce no load current and increase maximum torque at low frequencies in motor controllers which include relatively inaccurate feedback sensors.

BRIEF SUMMARY OF THE INVENTION

The present invention includes an apparatus which provides additional phase angle compensation at low frequencies to generate an accurate torque current $i_{qe}$ value. For every low frequency there is a correction angle which is indicative of a phase angle error. The inventive apparatus includes a look-up table which correlates rotor frequency and correction angle which is used to correct erroneous phase angles.

Correction angle data is generated for the table during a commissioning period. It has been recognized that if the flux of the motor is kept constant, the no load stator current $i_{so}$ is constant regardless of rotor frequency. For example, if the no load stator current at 60 Hz is 10 amps, the no load current at 5 Hz should likewise be 10 amps.

In light of this principle, a preferred commissioning procedure includes four steps. First, a motor is driven with no load at a nominal rotor frequency, for example 60 Hz, and the no load stator current is detected and recorded as an optimal stator current $i_{so}$. Second, the rotor is driven at a first low frequency, for example, 1 Hz, and the stator current is monitored. During this second step an operator alters an adjustment angle to modify the phase angle, until the monitored stator current $i_s$ is equal to the optimal stator current $i_{so}$. Third, once the monitored current $i_s$ is equal to the optimal current $i_{so}$, the adjustment angle is recorded as a correction angle which is correlated with the frequency (in this case 1 Hz). Fourth, the three steps above are repeated for many different low frequencies to derive correction angles for each frequency. All of the correction angles and correlated frequencies are then stored in the look-up table for control during normal motor operation.

During normal motor operation, the command frequency determines the correction angle from the look-up table. The correction angle is added to the phase angle which has been computed as previously described generating a corrected phase angle.

Thus, one object of the invention is to compensate for an incorrect phase angle calculation at low motor frequencies.

Another object is to provide an accurate feedback torque current $i_{qe}$. Once the corrected phase angle has been provided, the corrected angle can be used to determine the accurate current $i_{qe}$ value according to Equation 7.

Yet another object is to achieve the foregoing objects inexpensively and with only simple current sensors. To this end the only feedback values required are current magnitude on a single stator phase during commissioning and $i_{ds}$ and $i_{qs}$ currents during motor operation.

The foregoing and other objectives and advantages of the invention will appear from the following description. In the description, reference is made to the accompanying drawings which form a part hereof and in which there is shown by way of illustration several preferred embodiments of the invention. Such embodiments do not necessarily represent the full scope of the invention, however, and reference must be made therefore to the claims herein for interpreting the scope of the invention.

BRIEF DESCRIPTION OF THE SEVERAL VIEW OF THE DRAWINGS

DETAILED DESCRIPTION OF THE INVENTION

Theory

Ideally, if the motor is commanded to run with constant flux, no load stator current $i_s$ for a specific motor should remain constant regardless of applied voltage frequency. Thus, the no load stator current $i_s$ at low frequencies should be identical to the no load current $i_s$ at higher frequencies (e.g. >15 Hz). To determine an optimal no load stator current $i_s$ for a motor, the motor can be driven at a nominal applied voltage frequency $f_3$, for example 60 Hz, with no load and an optimal current magnitude $|i_{so}|$ can be measured.

Once the optimal no load magnitude $|i_{so}|$ is determined, the magnitude $|i_{so}|$ can be used to determine a phase angle correction for a motor operating at relatively low frequencies which will cause the optimal current magnitude $|i_{so}|$. To this end, a phase angle error, or correction angle, at a given stator frequency, can be determined by maintaining a constant test frequency and altering the computed phase angle $\delta$ by an adjustment angle $\theta$ while monitoring the magnitude $|i_s|$.

Figure 1:
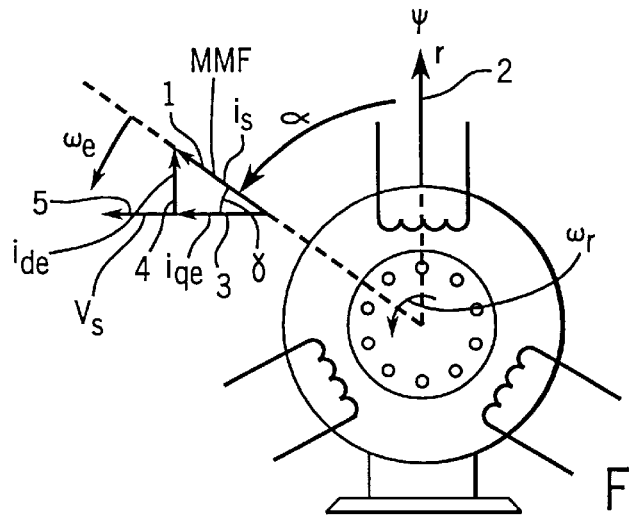
FIG. 1 is a schematic view in cross section of an induction motor showing instantaneous locations of the rotor flux, stator voltage, the stator MMF, and the torque and flux components of the stator MMF.
Figure 2:
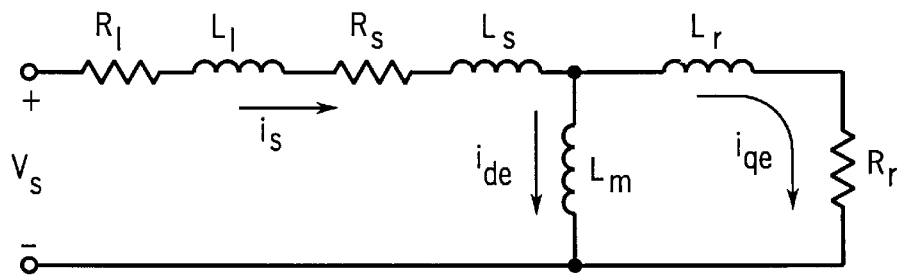
FIG. 2 is an induction motor equivalent circuit.
Figure 3:
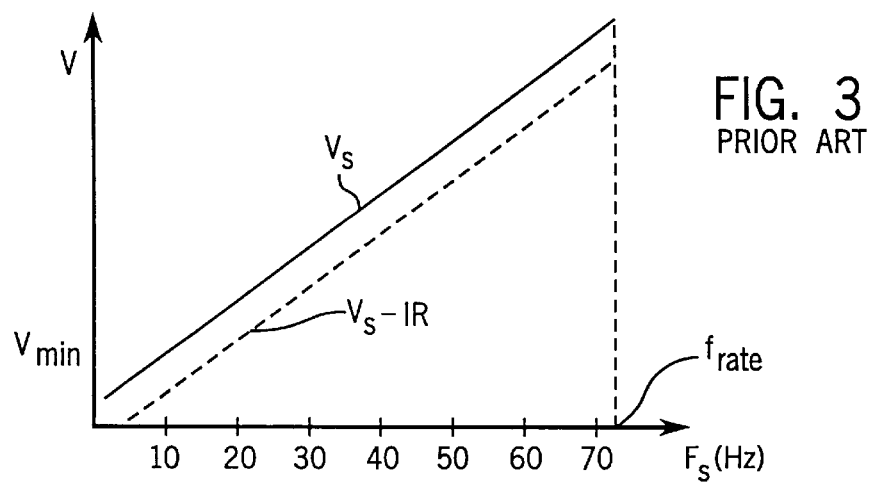
FIG. 3 is a graph depicting stator voltage as a function of rotor frequency.
Figure 4A:
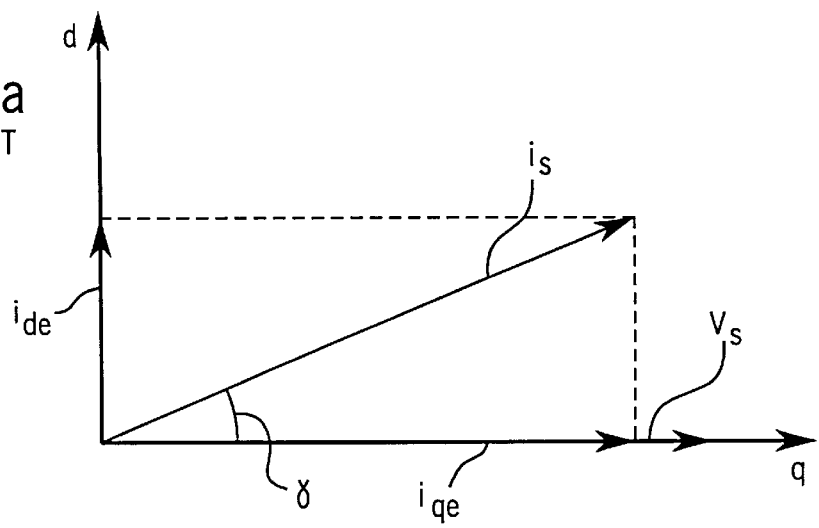
FIG. 4a is a graph depicting stator voltage, stator current and d and q-axis current components.
Figure 4B:
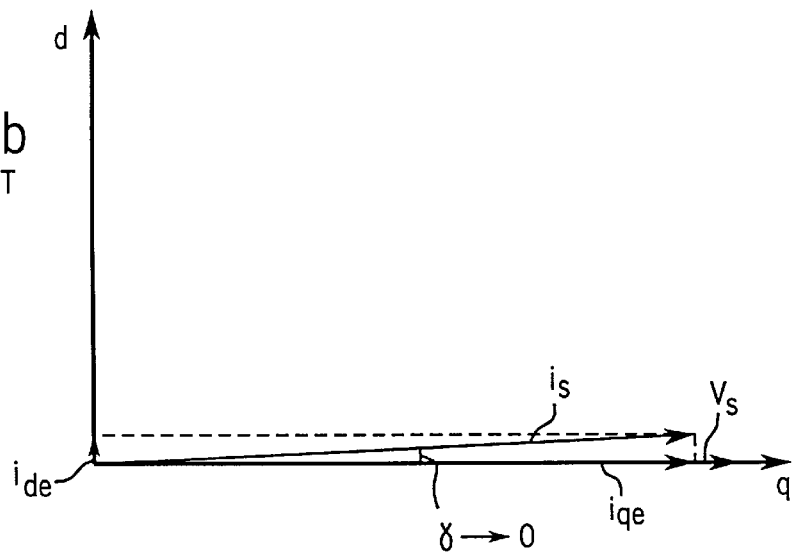
FIG. 4b is a graph similar to FIG. 4a for a motor at low frequency.
Figure 5:
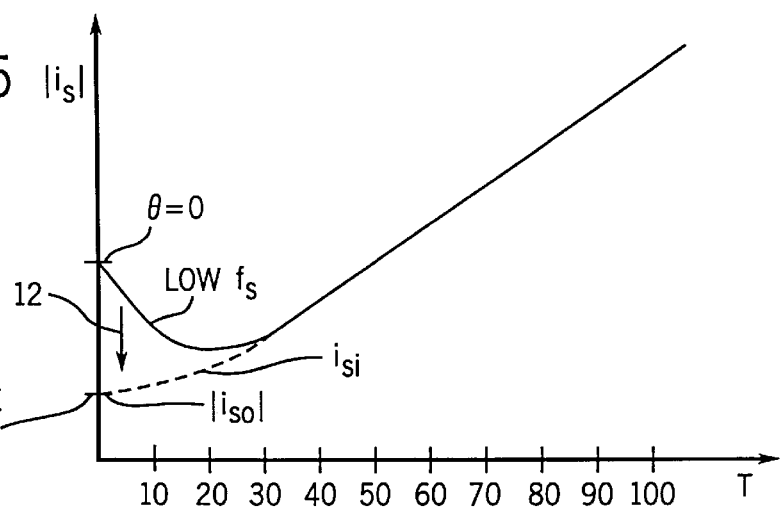
FIG. 5 is a graph illustrating stator current as a function of rotor frequency.

Referring again to FIG. 5, an optimal stator current $i_{s1}$ at low load is illustrated by a dotted line, the optimal no load current $|i_{so}|$ is the point where $i_{s1}$ crosses the abscissa while a typical low frequency no load current without correction is illustrated by the solid line. At no load and a low test frequency, prior to altering angle $\delta$, current magnitude $|i_s|$ is relatively high reflecting an incorrect angle $\delta$. However, as the adjustment angle $\theta$ is increased, current magnitude $|i_s|$ should decrease as indicated by arrow 12. Eventually, magnitude $|i_s|$ will be equal to the optimal no load current $|i_{so}|$. At this point the adjustment angle $\theta$ is substantially equal to the phase angle error and is referred to as a correction angle $\zeta$. Angle $\zeta$ can be recorded and correlated with the specific test frequency.

Then during no load or light load motor operation, when the applied frequency is reduced to the test frequency, angle $\delta$ can be corrected by adding correction angle $\zeta$ which is associated with the test frequency, to provide a corrected angle $\delta'$. Then corrected angle $\delta'$ can be used to determine torque current $i_{qe}$ and slip frequency $\omega_{slip}$ according to Equation 7 above with angle $\delta'$ substituted for angle $\delta$.

Figure 7:
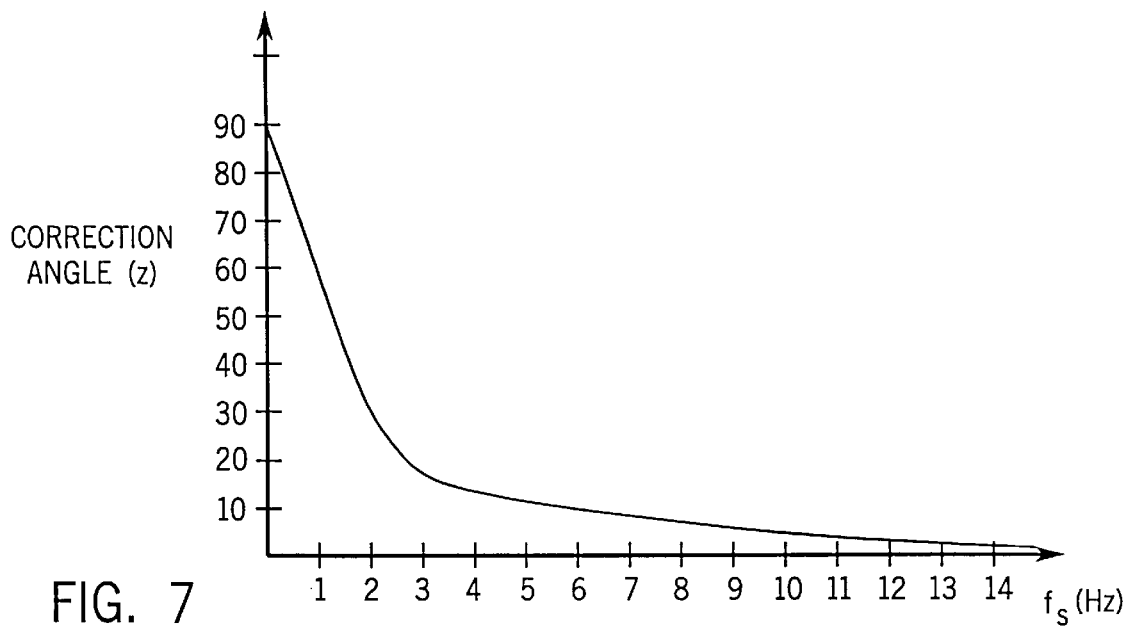
FIG. 7 is a graph illustrating correction angle $\zeta$ as a function of rotor frequency.

Referring also to FIG. 7, prior to normal motor operation, a plurality of correction angles $\delta$ can be generated, each angle at a different low test frequency $f_s$. Preferably correction angles $\zeta$ are generated for various test frequencies between 0 and 15 Hz. In FIG. 7, it can be seen that as the stator frequency $f_s$ approaches zero, the phase angle error increases until it reaches 90°. Near 15 Hz the angle approaches zero.

The correction angles $\zeta$ are placed in a lookup table to facilitate easy frequency/correction angle correlation. In operation, as the phase angles are corrected at low frequencies, the stator current is tied to an ideal steady state no load current level as desired.

Commissioning Procedure

According to the present invention, prior to operating the motor 22 under normal conditions (e.g. to drive a load), the motor is stepped through a commissioning procedure whereby a suitable, motor specific frequency/correction angle lookup table is generated. During the commissioning procedure, initially, the motor is driven without a load at a nominal 60 Hz stator frequency and the no load stator current magnitude $|i_s|$ is measured. The 60 Hz no load stator current magnitude $|i_s|$ is assumed to be an ideal no load current magnitude $|i_{so}|$.

Next, the motor is driven at an extremely low frequency, for example 1 Hz. While operating at 1 Hz, the current magnitude $|i_s|$ is monitored while an operator alters angle δ by a known alterable adjustment angle θ. Angle θ is increased and decreased in an iterative fashion until the current magnitude $|i_s|$ reaches the ideal no load current $|i_{so}|$. At this point, the adjustment angle θ is recorded as a correction angle ζ correlated with a frequency of 1 Hz.

Next, the rotor frequency is altered to provide a second frequency, for example 2 Hz. While operating at 2 Hz, current magnitude $|i_s|$ is again monitored while angle δ is altered by an adjustment angle θ until magnitude $|i_s|$ reaches the ideal no load current $|i_{so}|$. At this point, angle θ is again recorded, but this time as a correction angle ζ corresponding to the 2 Hz frequency.

This process continues for various motor frequencies to derive a specific correction angle ζ for each frequency and form a look up table correlating frequency and correction angle ζ. The table is then programmed into a memory (not shown) in a correction angle identifier for use in motor operation as described below.

Configuration In the description that follows, an "asterisk" denotes a "command" signal, an "e" subscript denotes that a signal is referenced to the synchronous reference frame, an "s" subscript denotes that a signal is referenced to the stationary frame of reference and a "r" subscript denotes that a signal is a rotor value.

Figure 6:
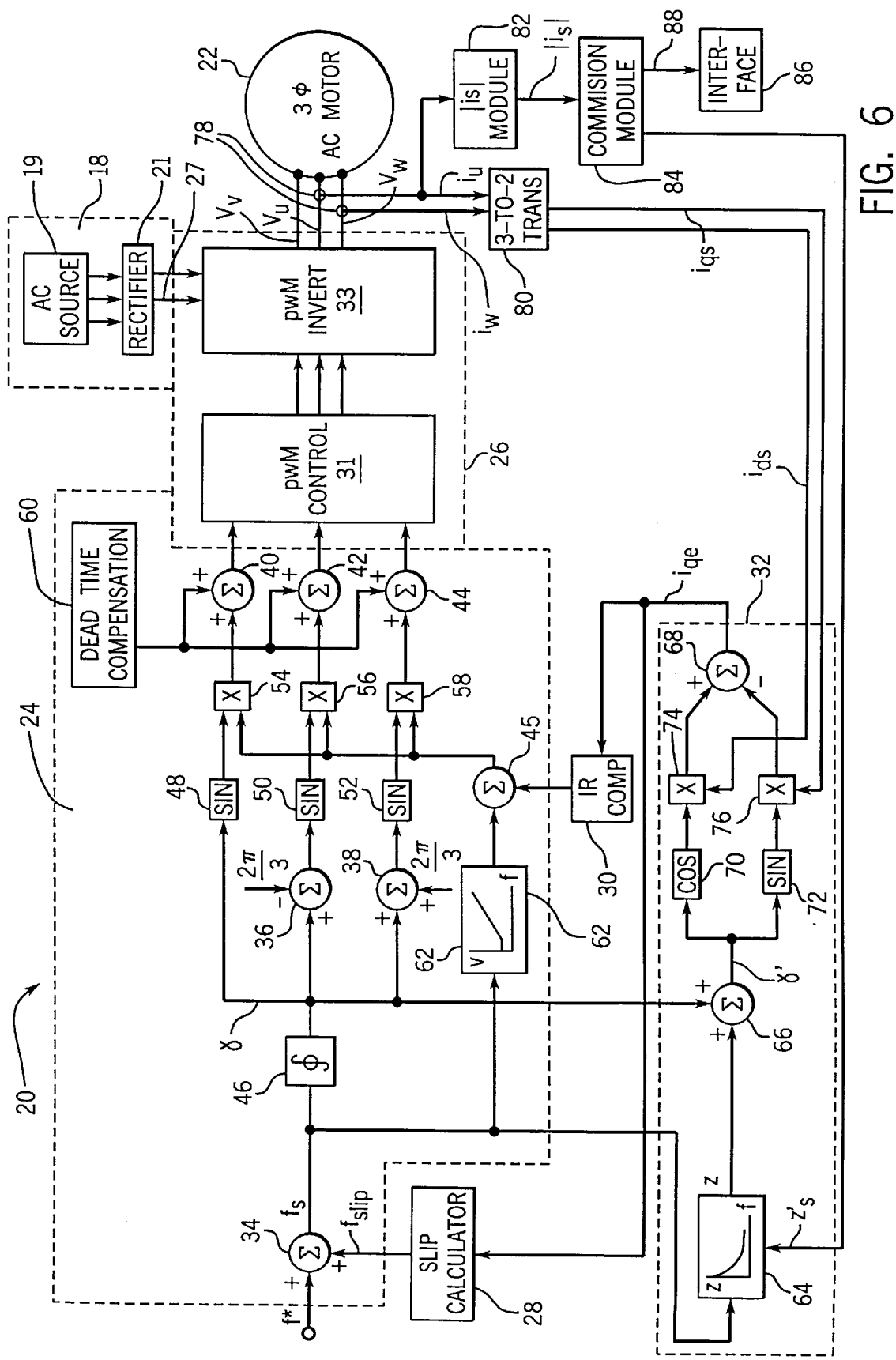
FIG. 6 is a block diagram of an induction motor control system according to the present invention.

Referring now to FIG. 6, the present invention will be described in the context of a motor drive 20 that receives a command frequency signal f* and produces voltages $V_u$, $V_v$ and $V_w$ to drive a motor 22 at the command frequency f*. Drive 20 includes a power section 18, a command signal modulator 24, a PWM generator 26, a slip calculator 28, an IR compensator 30, a torque current calculator 32 and various other components which will be described in more detail below.

The power section 18 receives power at a line frequency of 60 hertz from a three phase AC power source 19. The three phases of the power source are connected to an AC/DC power rectifier 21 which rectifies the alternating current signals from the AC source 19, to produce a DC voltage on a DC bus 27 that connects to power inputs on the generator 26. The source 19, rectifier 21 and bus 27 provide a DC source for generating a DC voltage of constant magnitude.

The inverter 33 includes a group of switching elements which are turned on and off to convert the DC voltage to pulses of constant magnitude. The inverter pulse train is characterized by a first set of positive going pulses of constant magnitude but of varying pulse width followed by a second set of negative going pulses of constant magnitude and a varying pulse width. The RMS value of this pulse train pattern approximates one cycle of a sinusoidal AC wave form. The pattern is repeated to generate additional cycles of the AC wave form. To control the frequency and magnitude of the resulting AC power signals to the motor, AC inverter control signals are applied to the inverter 33.

The control signals to drive the inverter 33 are provided by PWM control 31. Control 31 receives three sinusoidal input signals from summers 40, 42 and 44 and compares each of the input signals with a triangle carrier signal which has a much higher frequency than any of the input signals. When a sinusoidal input signal is greater than the carrier signal, a corresponding control signal provided to inverter 33 is high. When a sinusoidal input signal is less than the carrier signal, a corresponding control signal to inverter 33 is low.

The command signal modifier 24 includes 7 summers 34, 36, 38, 40, 42, 44 and 45, a single integrator 46, three sine modules 48, 50 and 52, three multipliers 54, 56 and 58, a dead-time compensation module 60 and a V/Hz selector module 62. Summer 34 receives the frequency command signal f* and a slip frequency signal $f_{slip}$, adds the two signals and provides an applied stator frequency signal $f_s$. Signal $f_s$ is provided to integrator 46 which integrates that signal providing a perceived phase angle δ.

Angle δ is provided to sine module 48, summer 36 and summer 38. Summer 36 phase shifts angle δ by subtracting 120° while summer 38 phase shifts angle δ by adding 120°. The outputs of summers 36 and 38 are provided to sine modules 50 and 52, respectively. Therefore, the angles provided to sign modules 48, 50 and 52 are all equispaced and separated from one another by 120 electrical degrees. The outputs of each sine module 48, 50 and 52, respectively, are sine waveforms at the stator electrical frequency $f_s$ with a phase shift of 120 electrical degrees and with an amplitude of one.

Stator frequency $f_s$ is also provided to the V/Hz selector module 62 which correlates the stator frequency $f_s$ with a suitable stator voltage, providing a stator voltage magnitude to summer 45. Summer 45 also receives a compensating input from IR compensator 30 which is calculated to compensate for IR losses in the line and stator resistances. The output of summer 45 therefore is a stator voltage magnitude which has been compensated for IR losses. This voltage magnitude is provided to each of the multipliers 54, 56 and 58. The output of each of multipliers 54, 56 and 58 is therefore a sinusoidal signal at stator frequency $f_s$ with a suitable voltage magnitude which has been compensated for IR losses.

The sinusoidal output voltages of multipliers 54, 56 and 58 are provided to summers 40, 42 and 44 where each is added to a suitable dead time compensation signal which is provided by dead time compensator 60 to compensate for turn on and turn off delay times in a manner which is well-known in the art. The outputs of summer 40, 42 and 44 are provided to PWM control 31 and are used as the sinusoidal voltages for comparison to the triangle carrier signal.

Referring still to FIG. 6, two current feedback loops are provided. A first current feedback loop is used during normal motor operation and includes two current sensors (e.g., Hall effect sensors) collectively referred to by the numeral 78 which provide two of the three stator winding current signals $i_w$, $i_u$. As well known in the art, the two current signals $i_w$ and $i_u$ can be used to derive the third current signal (i.e., $i_w$ plus $i_u$ equals negative $i_v$). After deriving the third current signal $i_v$, the three current signals are used by a three to two phase transformer 80 to provide two phase stationary d and q-axis feedback currents $i_{ds}$ and $i_{qs}$ according to the following equation:

$$\begin{bmatrix} i_{qsfb} \\ i_{dsfb} \end{bmatrix} = \frac{3}{2} \begin{bmatrix} 1 & 0 & 0 \\ \frac{1}{\sqrt{3}} & 0 & \frac{2}{\sqrt{3}} \end{bmatrix} \begin{bmatrix} i_u \\ i_v \\ i_w \end{bmatrix} \qquad \text{Eq. 8}$$

Currents $i_{ds}$ and $i_{qs}$ are provided to calculator 32.

The second feedback loop is used during a commissioning procedure to develop correction angles for the perceived phase angle. To this end, using the two current sensors 78, a current magnitude module 82 determines the magnitude of stator current $i_s$ which is provided to a commissioning module 84. A human interface (e.g., a computer) 86 enables an operator to communicate with the commissioning module 84 via a two-way bus 88. The interface 86 includes an indicting means (not shown) which allows the operator to observe the stator current magnitude $|i_s|$ during motor operation. In addition, the interface 86 includes an input means (also not shown) which allows the operator to change the phase angle ζ by an adjustment angle θ. Furthermore, the interface 86 allows an operator to store an adjustment angle θ as a correction angle correlated with a specific frequency in a correction angle identifier 64. Correction angles ζ are provided via the commissioning module 84 to identifier 64.

The torque current calculator 32 includes the correction angle identifier 64, two summers 66, 68, a cosine module 70, a sine module 72 and two multipliers 74 and 76.

During commissioning, the identifier 64 is programmed with correction angles ζ which are correlated with specific low motor frequencies to form a correction angle/frequency look-up table.

During normal motor operation, the stator frequency $f_s$ is provided to identifier 64 which correlates the stator frequency $f_s$ with a correction angle ζ and outputs the correction angle ζ to summer 66. Summer 66 receives perceived angle δ and adds the perceived angle δ and the correction angle ζ to provide a corrected phase angle δ'. The rest of the components in calculator 32 implement Equation 7. To the end, the corrected phase angle δ' is provided to cosine calculator 70 which provides the cosine of angle δ' to multiplier 74. Similarly, angle δ' is provided to sine module 72 which provides the sine of δ to multiplier 76. Multiplier 74 also receives stationary d current component $i_{ds}$ and provides the first term in Equation 7 as a output to summer 68. Multiplier 76 receives stationary q current component $i_{qs}$ and provides the second term in Equation 7 as a output to summer 68. Summer 68 subtracts the output of multiplier 76 from the output of multiplier 74 to generate a substantially accurate torque current component current $i_{qe}$.

Current $i_{qe}$ is provided to IR compensator 30 which alters the IR compensation factor provided to summer 45 as a function of the torque current $i_{qe}$.

In addition, the torque current $i_{qe}$ is provided to slip calculator 28 which determines the slip frequency $f_{slip}$ from Equation 5.

Operation

After a suitable correction angle/frequency look-up table has been generated during the commissioning period, normal motor operation can begin. During motor operation, where the motor is driven at a frequency which is approximately 15 hertz or less, and with little or no load, when the correction angle identifier 64 receives the stator frequency $f_s$, the identifier 64 will correlate the stator frequency $f_s$ with a correction angle ζ which will result in the no load stator current at the low frequency being the ideal no load stator current. Once a correction angle ζ has been determined, the angle ζ is provided to summer 66 which adds the angle to the perceived phase angle δ outputting the corrected phase angle δ' which is provided to cosine and sine module 70, 72 respectively. Then, the rest of calculator 32 implements Equation 7 providing an accurate torque current $i_{qe}$ which is used for both IR compensation and calculating slip frequency $f_{slip}$.

Although the present invention has been described above in the context of an apparatus, it should be understood that the present invention also contemplates a method to be used with a motor controller for determining an accurate torque current $i_{qe}$ where accurate current sensors are not provided. To this end, the method of the present invention includes integrating a stator electrical frequency to provide a perceived phase angle, generating a phase correction angle as a function of motor frequency and mathematically combining the perceived angle, the correction angle and current feedback signals to provide a torque current $i_{qe}$ value.

Figure 8:
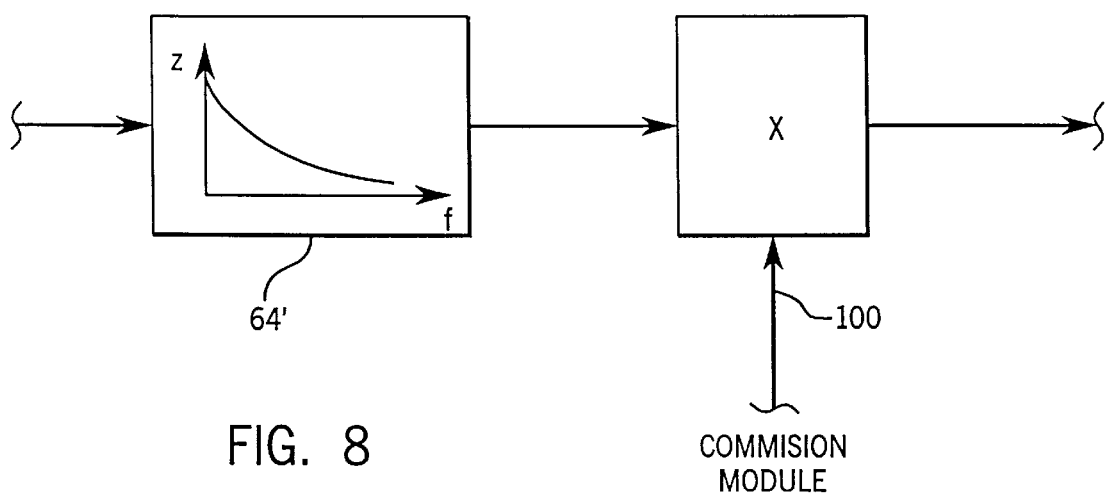
FIG. 8 is a block diagram of a section of a second embodiment of an inventive controller.

It should be noted that the method and apparatus as described above are only exemplary and do not limit the scope of this invention, and that various modifications could be made by those skilled in the art that may fall under the scope of this invention. For example, while the specification above details a commissioning procedure wherein the motor is driven at a plurality of different low frequencies to generate various correction angle/frequency data, in motors that are relatively less sophisticated, a much simpler commissioning procedure could be followed. For example, referring again to FIG. 7, it has been recognized that the correction angle/frequency curve illustrated therein is approximately the same for all low horsepower motors (i.e., motors generating less than 25 horsepower). This realization leads to the possibility that a single correction angle/frequency curve could be provided for all motors and a simple gain block to increase or decrease the correction angle during a commissioning period could be provided. To this end, referring also to FIG. 8, with a typical frequency/correction angle curve stored in identifier 64, during commissioning at a low frequency, a gain input 100 from the commissioning module can be altered until the monitored magnitude $|i_s|$ is equal to the optimal magnitude $|i_{se}|$. At that point the gain input 100 can be recorded for later use as a constant during normal motor operation.

In order to apprise the public of the various embodiments that may fall within the scope of the invention, we make the following claims.

We claim:

1. An apparatus to be used with a motor controller which adjusts motor operation at low frequencies and under no load conditions by altering PWM command signals as a function of a torque current $i_{qe}$ wherein current $i_{qe}$ is a real component of an apparent current and forms a phase angle therewith, the motor having a rated frequency and low frequencies being between zero hertz d a maximum percent of the rated frequency where the maximum percent is 50% or less, the controller including a sensor which is incapable of precisely determining the phase angle at the low frequencies, the apparatus for compensating for phase angle errors, the controller providing an applied stator voltage frequency signal, the apparatus comprising:

an integrator receiving the applied frequency signal and integrating the signal to provide a perceived phase angle;

an error module receiving the applied frequency signal and generating a corresponding correction angle;

a current detector providing stationary torque and stationary current feedback signals $i_{qs}$, $i_{ds}$, respectively; and a calculator for mathematically combining the perceived angle, the correction angle and the stationary current signals $i_{qs}$, $i_{ds}$ to provide a corrected torque current $i_{qe}$.

2. The apparatus of claim 1 wherein the error module includes a look-up table which correlates applied frequency and correction angle for the motor throughout a range of low frequencies and the error module generates the correction angle by correlating the applied frequency with a correction angle.

3. The apparatus of claim 2 wherein the rated frequency is 60 Hz and the range of frequencies is between zero and essentially 30 hertz.

4. The apparatus of claim 3 wherein the range of frequencies is between zero and essentially 15 hertz.

5. The apparatus of claim 2 wherein each entry in the look-up table is determined during a commissioning period wherein the motor is driven at a test applied frequency with no load while the phase angle is altered by an adjustment angle and the current magnitude is monitored, the correction angle for the test frequency being the adjustment angle when the current magnitude reaches an optimal magnitude.

6. The apparatus of claim 5 wherein the optimal magnitude is determined by driving the motor at a constant stator voltage frequency greater than half of the motor rated frequency and measuring a no load stator current magnitude which is the optimal magnitude.

7. The apparatus of claim 1 wherein the calculator includes a first calculator which mathematically combines the perceived angle and the correction angle providing a corrected angle and further includes a second calculator which mathematically combines the corrected angle and the stationary current signals $i_{ds}$ and $i_{qs}$ to provide the torque current $i_{qe}$ value.

8. The apparatus of claim 7 wherein the second calculator includes a sine calculator and a cosine calculator, both of which receive the corrected angle, the sine calculator generating the sine of the corrected angle and the cosine calculator generating the cosine of the corrected angle, the second calculator also including a first multiplier for mathematically combining the sine of the corrected angle and the current signal $i_{qs}$ and a second multiplier for mathematically combining the cosine of the corrected angle and the current signal $i_{ds}$, the second calculator further including a summer for mathematically combining the outputs of the first and second multipliers and providing the torque current $i_{qe}$ value.

9. The apparatus of claim 8 wherein the first and second multipliers each combine by multiplying and the summer combines by subtracting the output of the first multiplier from the output of the second multiplier.

10. A method to be used with a motor controller which adjusts motor operation at low frequencies and under no load conditions by altering PWM command signals as a function of a torque current $i_{qe}$ wherein current $i_{qe}$ is a real component of an apparent current and forming a phase angle therewith, the motor having a rated frequency and low frequencies being between zero hertz and a maximum percent of the rated frequency where the maximum percent is 50% or less, the controller including a sensor which is incapable of precisely determining the phase angle at low frequencies, the method for compensating for phase angle errors, the controller providing an applied stator voltage frequency signal, the method comprising the steps of:

integrating the applied frequency signal to provide a perceived phase angle;

generating a phase correction angle as a function of the applied frequency signal;

providing stationary current feedback signals $i_{qs}$, $i_{ds}$, respectively; and mathematically combining the perceived angle, the correction angle and the current signal $i_{qs}$ and current signal $i_{ds}$ to provide a torque current $i_{qe}$ value.

11. The method of claim 10 wherein the controller includes a look-up table which correlates applied frequency and correction angle for the motor throughout a range of low frequencies and the step of generating a correction angle includes the steps of accessing the look-up table and correlating applied frequency and correction angle.

12. The method of claim 11 wherein the rated frequency is 60 hertz and the range of frequencies is between zero and 30 hertz.

13. The method of claim 12 wherein the range of frequencies is between zero and 15 hertz.

14. The method of claim 11 further including a commissioning procedure for constructing the look-up table wherein the method further includes the steps of:
(a) driving the motor at no load while maintaining a constant test applied frequency;
(b) monitoring a stator current magnitude;
(c) adjusting the phase angle by an adjustment angle;
(d) when the current magnitude reaches an optimal magnitude, recording the adjustment angle as the correction angle corresponding to the test applied frequency; and
(e) altering the test applied frequency and repeating steps (a) through (d) until frequency/correction angle information has been recorded for a plurality of different frequencies.

15. The method of claim 10 wherein the step of mathematically combining includes the steps of mathematically combining the perceived angle and the correction angle to provide a corrected angle and mathematically combining the corrected angle and the current signal $i_{qs}$ and current signal $i_{ds}$ to provide the torque current $i_{qe}$ value.

16. The method of claim 15 wherein the step of mathematically combining the corrected angle and the current signals includes the steps of generating the sine of the corrected angle, generating the cosine of the corrected angle, mathematically combining the sine of the corrected angle and the torque current $i_{qs}$ to provide a first component, mathematically combining the cosine of the corrected angle and the current signal $i_{ds}$ to provide a second component and mathematically combining the first and second components to provide the torque current $i_{qe}$ value.

17. The method of claim 16 wherein the step of mathematically combining to provide a first component includes multiplying the sine of the corrected angle and the current signal $i_{qs}$, the step of mathematically combining to provide a second component includes multiplying the cosine of the corrected angle and the current signal $i_{ds}$ and the step of mathematically combining to provide the torque current $i_{qe}$ value includes subtracting the first component from the second component.

18. An apparatus to be used with a motor controller which adjusts motor operation at low frequencies and under no load conditions by altering PWM command signals as a function of a torque current $i_{qe}$ wherein current $i_{qe}$ is a real component of an apparent current and forming a phase angle therewith, the motor having a rated frequency and low frequencies being between 0 hertz and a maximum percent of the rated frequency where the maximum percent is 50% or less, the controller including a sensor which is incapable of precisely determining the phase angle at frequencies less than about half of the motor rated frequency, the apparatus for compensating for phase angle errors, the controller providing an applied voltage frequency, a stationary current signal $i_{qs}$ and a stationary current signal $i_{ds}$, the apparatus comprising:

an integrator receiving the applied frequency and integrating the applied frequency to provide a phase perceived phase angle;

an error module including a look-up table which correlates applied frequencies with correction angles for the motor throughout a range of low frequencies, each correction angle indicating the error in the phase angle, the error module receiving the applied frequency and generating a correction angle by correlating the applied frequency and a corresponding correction angle;

a first summer which adds the perceived angle and the correction angle providing a corrected angle;

a sine calculator which receive the corrected angle and generates the sine of the corrected angle;

a cosine calculator which receives the corrected angle and generates the cosine of the corrected angle;

a first multiplier which multiplies the sine of the corrected angle and the stationary current signal $i_{qs}$ providing a first component;

a second multiplier which multiplies the cosine of the corrected angle and the stationary current signal $i_{ds}$ providing a second component; and a second summer which subtracts the first component from the second component to provide the torque current $i_{qe}$.

19. The apparatus of claim 18 wherein each entry in the table is determined during a commissioning period wherein the motor is driven at a constant test frequency at no load while the phase angle is altered by an adjustment angle and the current magnitude is monitored, the correction angle for the test frequency being the adjustment angle when the current magnitude reaches an optimal magnitude.

* * * * *